(12) United States Patent
Antonini et al.

(10) Patent No.: US 10,537,877 B2
(45) Date of Patent: Jan. 21, 2020

(54) SILICA-MODIFIED CATALYST SUPPORTS

(71) Applicant: JOHNSON MATTHEY PUBLIC LIMITED COMPANY, London (GB)

(72) Inventors: Alejandro Martin Antonini, Cleveland (GB); Richard John Mercer, Cleveland (GB); Jose Angel Ruiz Adan, Cleveland (GB)

(73) Assignee: Johnson Matthey Public Limited Company, London, England (GB)

( * ) Notice: Subject to any disclaimer, the term of this patent is extended or adjusted under 35 U.S.C. 154(b) by 0 days.

(21) Appl. No.: 15/746,490

(22) PCT Filed: Jul. 12, 2016

(86) PCT No.: PCT/GB2016/052098
§ 371 (c)(1),
(2) Date: Jan. 22, 2018

(87) PCT Pub. No.: WO2017/017406
PCT Pub. Date: Feb. 2, 2017

(65) Prior Publication Data
US 2018/0207616 A1    Jul. 26, 2018

(30) Foreign Application Priority Data
Jul. 30, 2015    (GB) .................................. 1513471.1

(51) Int. Cl.
| | | |
|---|---|---|
| *B01J 35/00* | (2006.01) | |
| *B01J 21/12* | (2006.01) | |
| *B01J 23/75* | (2006.01) | |
| *B01J 35/02* | (2006.01) | |
| *B01J 37/02* | (2006.01) | |
| *B01J 37/08* | (2006.01) | |
| *C10G 2/00* | (2006.01) | |

(52) U.S. Cl.
CPC .............. *B01J 21/12* (2013.01); *B01J 23/75* (2013.01); *B01J 35/0006* (2013.01); *B01J 35/026* (2013.01); *B01J 37/0217* (2013.01); *B01J 37/0219* (2013.01); *B01J 37/0221* (2013.01); *B01J 37/0236* (2013.01); *B01J 37/082* (2013.01); *C10G 2/332* (2013.01)

(58) Field of Classification Search
CPC .... B01J 35/0006; B01J 35/026; B01J 35/023; B01J 35/1009; B01J 35/1038; B01J 35/1042; B01J 35/02; B01J 35/00; B01J 37/0221; B01J 37/0236; B01J 37/082; B01J 37/0217; B01J 37/0219; B01J 37/08; B01J 37/0045; B01J 37/0209; B01J 37/0207; B01J 37/02; B01J 23/75; B01J 21/12; C10G 2/332; C10G 2/33; C10G 2/00

See application file for complete search history.

(56) References Cited

U.S. PATENT DOCUMENTS

| | | | | |
|---|---|---|---|---|
| 8,927,783 B2* | 1/2015 | Horton | .................. | C07C 29/149 568/885 |
| 2009/0098032 A1* | 4/2009 | Yang | ..................... | B01D 53/945 423/213.2 |
| 2013/0023593 A1* | 1/2013 | Antonini | .............. | B01J 23/8913 518/715 |
| 2015/0057378 A1* | 2/2015 | Visagie | ................ | B01J 37/0205 518/705 |

FOREIGN PATENT DOCUMENTS

| | | |
|---|---|---|
| WO | WO 99/44214 A1 | 9/1999 |
| WO | WO2011089411 A1 | 7/2011 |
| WO | WO2013/088290 A1 | 6/2013 |

OTHER PUBLICATIONS

PCT/GB2016/052098, international Search Report dated Sep. 28, 2016.
PCT/GB2016/052098, Written Opinion dated Sep. 28, 2016.
GB1513471.1, Search Report Under 17(5) dated Feb. 29, 2016.
GB1612051.1, Combined Search and Examination Report Under Sections 17 and 18(3) dated Jan. 23, 2017.

* cited by examiner

*Primary Examiner* — Melvin C. Mayes
*Assistant Examiner* — Smita S Patel
(74) *Attorney, Agent, or Firm* — BakerHostetler

(57) ABSTRACT

A method for preparing a silica-modified catalyst support is described comprising: (i) applying an alkyl silicate solution to a porous support material in an amount to produce a silica content of the silica-modified catalyst support, expressed as Si, in the range 0.25 to 15% by weight, (ii) drying the resulting silicate-modified support and recovering a first alcoholic solution, (iii) optionally treating the dried silicate-modified support with water, drying the resulting water-treated support and recovering a second alcoholic solution, and (iv) calcining the dried material to form the silica-modified catalyst support, wherein the first alcoholic solution contains ≤10 vol % water and at least a portion of the first alcoholic solution is mixed with alkyl silicate to form the alkyl silicate solution.

26 Claims, No Drawings

SILICA-MODIFIED CATALYST SUPPORTS

CROSS-REFERENCE TO RELATED APPLICATIONS

This application is the National Stage of International Patent Application No. PCT/GB2016/052098 filed Jul. 12, 2016, which claims priority from Great Britain Patent Application No. 1513471.1, filed Jul. 30, 2015, the disclosures of each of which are incorporated herein by reference in their entirety.

This invention relates to a method for the preparation of silica-modified catalyst supports and in particular catalyst supports suitable for preparing Fischer-Tropsch catalysts.

Oxide materials such as aluminas, titanias and zirconias are used as catalyst supports in a wide range of industrial processes, including the Fischer-Tropsch synthesis of hydrocarbons. The catalyst support provides a surface over which the catalytically active material is dispersed. The catalyst support may also confer other properties on the catalyst such as physical and chemical stability.

In order to adapt properties such as solubility, it is known to surface modify support materials with silica. This may be done by applying a silicon compound to the surface of the support material followed by drying and calcining to decompose the silicon compound and leave silica deposited as a coating on the catalyst support.

WO 99/42214 describes a method of treating a catalyst support comprising introducing onto and/or into an untreated catalyst support, which is partially soluble in an aqueous acid solution and/or a neutral aqueous solution, Si, Zr, Cu, Zn, Mn, Ba, Co, Ni and/or La as a modifying component. In the Examples, silica-modified alumina and titania materials were made by adding alumina or titania to ethanol solutions of tetraethyl-orthosilicate (TEOS), holding the resulting mixture at 50-75° C. for one hour before drying under vacuum at 95° C. and calcining at 500° C. to decompose the silicon compound. This method has a problem that unreacted TEOS is volatilised during calcining leading to poor materials usage and, equipment fouling.

WO2011/089411 describes a method for preparing a silica-modified catalyst support comprising: (i) applying an alkyl silicate to the surface of a porous support material in an amount to produce a silica content of the silica-modified catalyst support, expressed as Si, in the range 0.25 to 15% by weight, (ii) optionally drying the resulting silicate-modified support, (iii) treating the support with water, (iv) drying the resulting water-treated support, and (v) calcining the dried material to form the silica-modified catalyst support. In this process the alkyl silicate is applied as a solution in an alcohol, preferably an alcohol corresponding to that in the alkyl silicate. This method overcomes the fouling problem. Nevertheless it may be desirable to recycle alcohol to the process.

WO2013/088290 describes a method of preparing a modified catalyst support comprises contacting a catalyst support material with a modifying component precursor in an impregnating liquid medium. The impregnating liquid medium comprises a mixture of water and an organic liquid solvent for the modifying component precursor. The mixture contains less than 17% by volume water based on the total volume of the impregnating liquid medium. The modifying component precursor comprises a compound of a modifying component selected from the group consisting of Si, Zr, Co, Ti, Cu, Zn, Mn, Ba, Ni, Al, Fe, V, Hf, Th, Ce, Ta, W, La and mixtures of two or more thereof. A modifying component containing catalyst support material is thus obtained. Optionally, the modifying component containing catalyst support material is calcined at a temperature above 100° C. to obtain a modified catalyst support. In the Examples, an impregnating liquid medium comprising TEOS, ethanol and 2.5-17 vol % water, was mixed with an alumina support at 60° C. The impregnating liquid medium was slowly removed while gradually decreasing the pressure from atmospheric pressure to 80 mbar(a) and maintaining it at 80 mbar(a) until dryness, while the temperature was maintained at 60° C. TEOS and other alkyl silicates are not stable in aqueous solutions and reaction of the alkyl silicate with water can lead to viscosity increase and potentially gelation.

We have developed an improved treatment process in which the problems of the prior art processes are overcome.

Accordingly the invention provides a method for preparing a silica-modified catalyst support comprising:
(i) applying an alkyl silicate solution to a porous support material in an amount to produce a silica content of the silica-modified catalyst support, expressed as Si, in the range 0.25 to 15% by weight,
(ii) drying the resulting silicate-modified support and recovering a first alcoholic solution,
(iii) optionally treating the dried silicate-modified support with water, drying the resulting water-treated support and recovering a second alcoholic solution, and
(iv) calcining the dried material to form the silica-modified catalyst support,
wherein the first alcoholic solution contains ≤10 vol % water and at least a portion of the first alcoholic solution is mixed with alkyl silicate to form the alkyl silicate solution.

Any catalyst support reactive towards alkyl silicates may be treated by the method of the present invention. The catalyst supports are typically metal oxides and hydroxides or hydrated oxides. The porous support preferably comprises alumina, titania, or zirconia. Silica may also be present. More preferably the porous support comprises a transition alumina or hydrated alumina such as boehmite or alumina trihydrate. The transition alumina may be of the gamma-alumina group, for example a eta-alumina or chi-alumina. These materials may be formed by calcination of aluminium hydroxides at 400 to 750° C. and generally have a BET surface area in the range 150 to 400 $m^2/g$. Alternatively, the transition alumina may be of the delta-alumina group, which includes the high temperature forms such as delta- and theta-aluminas that may be formed by heating a gamma group alumina to a temperature above about 800° C. The delta-group aluminas generally have a BET surface area in the range 50 to 150 $m^2/g$. The transition alumina preferably comprises gamma alumina and/or a delta alumina with a BET surface area in the range 120-250 $m^2/g$.

The support material should be of suitable purity for use as a catalyst support. In particular, in Fischer-Tropsch catalysts, the level of alkali metal, notably sodium, in the support is desirably <100 ppm w/w, more preferably <50 ppm w/w.

The porous support may be in any form used as a catalyst support. For example, the porous support may be a spray-dried powder, or in the form of a pellet, extrudate or granule, or a honeycomb or other monolithic structure. A suitable powder catalyst support generally has a volume-median diameter, D[v,0.5], in the range 1 to 200 μm. In certain applications such as for catalysts intended for use in slurry reactions, it is advantageous to use particles which have a volume-median diameter, D[v,0.5], in the range from 25-150 μm. For other applications e.g. as a catalyst for reactions carried out in a fluidised bed, it may be desirable to use larger particle sizes, preferably with a volume-median diameter, D[v,0.5], in the range 25 to 1000 μm or larger. The term volume-median diameter, D[v,0.5], sometimes given as $D_{50}$ or $D_{0.5}$, is defined by Dr Alan Rawle in the paper "Basic Principles of Particle Size Analysis" available from Malvern Instruments Ltd, Malvern, UK (see www.malvern.co.uk), and is calculated from the particle size analysis which may conveniently be effected by laser diffraction for example using a "Malvern Mastersizer". Shaped units, including 3D-printed shapes, pellets, extrudates or granules, which may be used in fixed bed arrangements, typically have a particle size, usually expressed as the width or diameter, in the range 1 to 50 mm, preferably 1 to 25 mm and an aspect ratio (i.e. length/width or diameter) of <10. Preferred shaped units are pellets or extrudates with a width or diameter in the range 1-10 mm and an aspect ratio 0.5-5.

The pore volume of the support is preferably relatively high in order to achieve high metal loadings. The pore volume is preferably above 0.25 $cm^3/g$, more preferably in the range 0.30 to 0.75 $cm^3/g$, and may be determined by nitrogen physisorption using known techniques. It is preferred that the support has a relatively large average pore diameter as the use of such supports may result in Fischer-Tropsch catalysts of particularly good selectivity to higher hydrocarbons. Preferred supports have an average pore diameter (APD) of at least 10 nm, particularly in the range 12 to 20 nm. [By the term average pore diameter we mean 4 times the pore volume as measured from the adsorption branch of the nitrogen physisorption isotherm at 0.99 relative pressure divided by the BET surface area].

In order that the alkyl silicate may better react with the surfaces of the porous support, the surfaces of the porous support may be pre-activated prior to application of the alkyl silicate by treating the porous support with an acidic wash solution and drying the acid-washed support. The acid may be an inorganic acid such as nitric acid, or an organic acid such as citric or malonic acid. Aqueous wash solutions are preferred. Aqueous nitric acid is preferred as it additionally removes alkaline contaminants that may be present in the support. Following the acid wash, it is not necessary to water-wash the support, which may simply be filtered if necessary and dried at 30-150° C.

The alkyl silicate may be any suitable alkyl silicate, i.e. one normally liquid at room temperature and having one or more alkyl silicate (Si—O—R) groups. Thus silanes having one, two or three Si—OR groups may be used although this is less preferred as they can be less reactive with the support material. Preferably, the alkyl silicate is a tetra-alkyl silicate, more preferably a tetra-alkyl silicate of formula $Si(OR)_4$, where R is a C1-C4 alkyl group. The alkyl groups may be linear or branched and functionalised or un-functionalised. A particularly preferred alkyl silicate is tetraethyl-orthosilicate (TEOS). Upon hydrolysis, i.e. upon a reaction with water or a surface hydroxyl group on the support, the alkyl silicate releases the corresponding alcohol to form the alcohol in the first and second alcoholic solutions. Thus where TEOS is used, the alcohol in these solutions is ethanol.

While silica in amounts up to 32% wt (about 15% wt Si) may be applied, the silica content of the silica-modified catalyst support, expressed as Si, is preferably in the range 1 to 10% Si by weight, more preferably in the range 2-6% wt Si. In this way the properties conferred by the silica coating may be achieved without excessive silica blocking pores in the catalyst support.

The alkyl silicate solution comprises the first alcoholic solution as a solvent for the alkyl silicate. Whereas fresh alcohol may be added to the alkyl silicate solution with the alkyl silicate and first alcoholic solution, preferably the alkyl silicate solution consists of the alkyl silicate and first alcoholic solution. In start-up of the process, fresh alcohol, e.g. ethanol, may be used in place of the first alcoholic solution. If desired, the fresh alcohol may be combined with water to provide an aqueous alcoholic solution having the claimed water content. Subsequent operation of the process will use the first alcoholic solution.

The alkyl silicate is applied to the support material as a solution comprising alcohol and water. The concentration of the alkyl silicate therefore effects the molar ratio of water: alkyl silicate in the alkyl silicate solution and the viscosity of the solution. The lower the concentration of alkyl silicate, the more hydrolysis of alkyl silicate may take place before the solution is applied to the support. The higher the concentration of alkyl silicate the higher the initial viscosity. The alkyl silicate concentration in the alkyl silicate solution comprising the alkyl silicate, alcohol and water is preferably in the range 50-75% by weight, preferably 60-70% by weight.

Water is present in the first alcoholic solution. In the present process, because the first alcoholic solution is used to prepare the solution of alkyl silicate, which is reactive towards the water, it is desirable to control the water content. The water content of the first alcoholic solution is controlled at ≤10% by volume, preferably <5% by volume, more preferably <2.5% by volume (<3.2% by weight), most preferably ≤2.3% by volume. If desired the water content of the first alcoholic solution may be ≤2.00% by volume, or even ≤1.50% by volume. The water content may be controlled in the range 0.05-10% by volume or 0.05-5% by volume, and may more suitably be controlled in the range 0.05-2.45% by volume, preferably 1.00-2.45% by volume more preferably 1.00-2.30% by volume. The water in the first alcoholic solution may arise from the extractable water content of the porous support material and/or another source.

In one embodiment, the water content of the first alcoholic solution may be provided by controlling the water content of the porous support material. This may be achieved for example by using a porous support material with a moisture content at, or adjusted to, ≤6.0 wt %, preferably ≤3.0 wt %, more preferably ≤2.5 wt %, most preferably ≤1.5 wt %, especially ≤1.0 wt %. We have found that the water is typically present in support materials, especially alumina support materials. For example, transition aluminas may comprise 3 to 6% wt water. Whereas the alkyl silicate is reactive with water in the support material, not all of the water reacts under the treatment conditions. Upon drying the treated porous support material, unreacted water is recycled in the first alcoholic solution. Therefore, in order to control the water content of the first alcoholic solution, the support material may be pre-dried to a water content ≤6.0 wt %, preferably ≤3.0 wt %, more preferably ≤2.5 wt %, most preferably ≤1.5 wt %, and especially ≤1.0 wt %. However, a minimum water content is desirable in the support material to ensure a suitable reactivity towards the alkyl silicate. The minimum water content of the support material is preferably about 0.5 wt %, more preferably about 0.75 wt %. Techniques suitable for pre-drying the support material are known and include cylindrical or conical batch dryers. Pre-drying may suitably be performed at 120-150° C. at atmospheric pressure or under vacuum. Additionally, or alternatively, the first alcoholic solution may be treated to adjust the water content to the desired level. Thus in another embodiment, the water content of the first alcoholic solution may be controlled by subjecting the first alcoholic solution to a dehydration step. This dehydration step may include one or more steps of distillation, adsorption and membrane separation. Distillation methods include azeotropic distillation, e.g. with cyclohexane, and extractive distillation e.g. with ethylene glycol or tetraethylene glycol. Adsorption methods may include pressure-swing adsorption e.g. with molecular sieves. Membrane separation methods may include pervaporation. These methods are known in industry for removing water from alcohols, especially ethanol. In a further embodiment, both drying of the support material and dehydration of the first alcoholic solution may be performed as described herein to control the desired water content. If desired, in combination with the techniques described above, the water content of the first alcoholic solution may also be adjusted by dilution with fresh alcohol.

Unlike the method of the aforesaid WO 99/44214 in a preferred embodiment, the volume of the alkyl silicate solution is less than or equal to the pore volume of the porous support material. By using this so-called "incipient wetness" method, the silicate is primarily deposited within the pores of the support material. It also reduces the amount of liquid to be removed in drying and makes a separate filtration step unnecessary.

The alkyl silicate and porous support material may be combined using known mixing apparatus. Preferably the solution and support are combined in a mixer-drier. This has the advantage of reducing the footprint of the apparatus. The alkyl silicate solution may conveniently be sprayed onto the porous support mixture.

A reaction between the alkyl silicate and reactive sites on the porous support takes place with the evolution of alcohol. This may be illustrated, for a tetra-alkyl silicate, as follows:

$$Si(OR)_4 + 4H_2O \rightarrow Si(OH)_4 + 4ROH$$

Depending on the reaction conditions, the conversion of the alkyl silicate may be incomplete. The silicate-modified support, before drying may therefore comprise alcohol, water and unreacted alkyl silicate.

The silicate-modified support is dried, preferably at a temperature in the range 30-150° C. At this stage, drying at atmospheric pressure is sufficient and vacuum drying is not necessary but it may be used if desired as described below. Drying times may vary depending on the support, but typically may be in the range 0.5 to 8 hours. Drying may be continued until the residual moisture content of the dried material is 5% by weight, preferably 1.5% by weight, more preferably ≤1.0% by weight. Apparatus may be provided to condense or otherwise recover the alcohol and water vapours evolved during the drying process, i.e. to form the first alcoholic solution. Conventional condenser apparatus may be used. Because the reaction of the alkyl silicate with the porous support material is typically incomplete, the drying step may result in alkyl silicate being present in the first alcoholic solution along with alcohol and water. The amount of alkyl silicate in the first alcoholic solution is preferably ≤10% by weight, more preferably ≤7.5% by weight of the first alcoholic solution. The amount of alkyl silicate is desirably minimised.

Where TEOS is used as the alkyl silicate the first alcoholic solution will typically comprise ethanol, water and a small amount of TEOS.

The dried silicate-modified support may be calcined or may be subjected to a treatment with water. Treatment with water is preferred because it causes further reaction of the alkyl silicate, which otherwise may be volatilised during calcination. The treatment with water forces the hydrolysis and condensation reactions of the alkyl silicate on the support causing it to cross-link, thereby increasing its molecular mass and reducing its volatility. Complete hydrolysis of a tetra-alkyl silicate yields 4 moles of alcohol per Si atom to leave a hydrous silica material deposited on the catalyst support. Thus a water treatment is highly desirable to reduce losses of alkyl silicate during a subsequent calcination stage. In one embodiment the water treatment uses water as such. The water used may be mains water, distilled or purified water, demineralised water, or another source of water suitable for use in the process. In this embodiment, the water desirably contains <1000 ppm wt dissolved salts or other contaminants. Water with high natural salt contents is less preferred because of the alkali and alkaline earth metal contents, which are undesirable in Fischer-Tropsch catalysts. In one embodiment, the water may contain an alcohol. The alcohol content of water may, for example, be in the range 4-23% by volume (5-30% by weight). This may conveniently be provided by part of the first alcoholic solution or it may be provided from another source such as the second alcoholic solution. Howsoever the water-containing-alcohol is provided; the alcohol preferably matches that of the alkyl silicate to simplify downstream processing. Treatment with water not containing any alcohol is however generally preferred to treatment with water containing alcohol.

The water treatment, if used, comprises applying liquid water or water-containing alcohol to the support. Whereas the silicate-modified support may be immersed or slurried in the liquid, in a preferred embodiment, the liquid is applied by spraying and the volume used is desirably equal to or less than the pore volume of the dried silicate-modified support. This reduces the amount of liquid to be removed in a subsequent drying step and removes the need for a separate filtration step. The water-treated support may be dried to remove water and alcohol evolved from the alkyl silicate. Drying may be performed at atmospheric pressure or, optionally, at least part of the drying step may be performed under vacuum. Preferably, if vacuum drying is employed, the water-treated support is dried for a period at ambient pressure before being dried under vacuum. Thus the water-treated support may be dried for a first period at ambient pressure and then a second period under vacuum. The vacuum may be in the range 400-700 mm Hg absolute pressure. The water treated support may be dried at a temperature in the range 30-150° C. Drying times may vary depending on the support and whether vacuum drying is employed, but the drying step or steps may be in the range 0.5 to 8 hours. Apparatus may be provided to condense or otherwise recover the alcohol and water evolved during the drying process as the second alcoholic solution. Conventional condenser apparatus may conveniently be used. The second alcoholic solution may contain 25-50% by volume of water (i.e. 50-75% by volume of alcohol). The alkyl silicate content of the second alcoholic solution is preferably <1% by weight). If desired, a part of the second alcoholic solution may be used, preferably diluted with water, in the water treatment step described above.

The dried material, i.e. the dried silicate-modified support with or without the optional water treatment step, is calcined to anchor the hydrolysed alkyl silicate to the support via dehydration and cross-linking. Where a water treatment step is included, the subsequent drying and calcining steps may be combined if desired. Preferably the calcination step is performed by heating the dried material to a temperature in the range 500-1100° C., preferably 820-1000° C., more preferably 900-975° C. Calcination time may be in the range 0.5 to 8 hours. Any calcination equipment may be used.

We have found that using the method of the present invention, the silica content of the calcined catalyst support may be ≥90% wt of that derivable from the amount of alkyl silicate applied to the porous support. Examples of retention of ≥95% wt of the Si have been obtained.

The present invention provides a useful recycle of alcoholic solutions to the process and therefore reduces the environmental impact of the process compared to prior art processes. The low level of water in the first alcoholic solution used to prepare the alkyl silicate solution prevents unwanted hydrolysis and subsequent polymerisation of the alkyl silicate.

The silica-modified catalyst supports may be used to prepare a range of catalyst materials comprising a catalytically active material on the silica-modified catalyst support.

Accordingly the invention further provides a method of preparing a catalyst comprising the step of applying a catalytically active material to the silica-modified catalyst support prepared as described herein.

The catalysts may be prepared according to methods known to those skilled in the art for example by impregnation techniques whereby the catalytically active metal, e.g. Co, Cu, Ni, Fe, Cr, Mo, Ti, Mn, Zn, Pt, Pd, Ru, Re is deposited onto or within the modified support. Such catalysts may find use in a wide range of industrial applications such as hydrocarbon purification, hydrodesulphurisation, reforming, water-gas shift reactions, methanol and ammonia synthesis, hydrogenation of oils and fats, polymerization of olefins and the Fischer-Tropsch synthesis of hydrocarbons. The oxides may also be used to 'heterogenize' homogeneous catalysts, for example in organic synthesis such as asymmetric hydrogenation reactions.

Preferably, the catalysts are cobalt-containing catalysts, including promoted cobalt catalysts. Particularly preferred catalysts comprise Co in an amount in the range 10-30% by weight, more preferably 15-30% by weight. Precious metal promoters selected from one or more of Pt, Pd, Ru, Re may also be included in amounts in the range 0.01-1.0% by weight. Cobalt catalysts prepared on the supports produced according to the present invention may have cobalt surface areas (as determined by hydrogen chemisorption at 150° C. following reduction at 425° C.) of ≤8 $m^2$/g catalyst (typically ≥50 $m^2$/g Co). In addition, the Co catalysts may have an attrition weight loss (as determined by ASTM D5757-00) of ≤5.0% wt, preferably ≤2.0% wt. Such catalysts are particularly useful in the Fischer-Tropsch synthesis of hydrocarbons.

Accordingly, the invention further provides a process for the Fischer-Tropsch synthesis of hydrocarbons comprising contacting a gas mixture containing hydrogen and carbon monoxide over a cobalt-catalyst comprising a support prepared as described herein.

The Fischer-Tropsch synthesis of hydrocarbons with cobalt catalysts is well established. The Fischer-Tropsch synthesis converts a mixture of carbon monoxide and hydrogen to hydrocarbons. The mixture of carbon monoxide and hydrogen is typically a synthesis gas having a hydrogen: carbon monoxide ratio in the range 1.0-4.0:1, preferably 1.5-2.2:1. The reaction may be performed in a continuous or batch process using one or more fixed bed reactors, stirred slurry-phase reactors, jet-loop reactors, bubble-column reactors, or fluidised bed reactors. The process may be operated at pressures in the range 0.1-10 Mpa and temperatures in the range 150-350° C., preferably 200-250° C. The gas-hourly-space velocity (GHSV) for continuous operation is in the range 100-25000 $hr^{-1}$. A preferred operating range is 1000-15000 $hr^{-1}$. Cobalt catalysts prepared on the supports prepared according to the present invention are capable of providing C5+ hydrocarbons at >200 g/kg catalyst per hour at a selectivity of >75% molar carbon under standard operating conditions.

The invention is further illustrated by reference to the following examples. A process model was developed to establish the mass balances for treatment of a gamma alumina with a tetraethylorthosilicate (TEOS) solution in ethanol over a series of batches.

EXAMPLE 1

A solution was formed using 118 kg ethanol/water having a water content of 0.85% wt and 212 kg of TEOS. This solution was added to a mixer drier where it was mixed with 655 kg of a gamma alumina containing 19.65 kg water (3% by weight) under nitrogen. The mixture was dried at 80° C. for 2 hours. The water content in the dried product was 1% by weight. The vapours evolved during the drying process were fed to a condenser at 10° C. to collect a first alcoholic solution comprising 134.3 kg ethanol, 8.1 kg TEOS and 4.7 kg water. The water content therefore without pre-drying of the alumina or a dehydration treatment of the first alcoholic solution was 3.2% wt (2.5% by volume). However, the effect of the recycle of the first alcoholic solution recovered from the condenser and the gamma alumina containing 3% wt water was to increase the water content of the first alcoholic solution over the subsequent batches towards a steady state of 5.1% wt (4.0% by volume) as follows;

| Batch No. | Water in first alcoholic solution (% wt) | Water in first alcoholic solution (% vol) |
|---|---|---|
| 1 | 3.2 | 2.5 |
| 2 | 4.3 | 3.4 |
| 3 | 4.8 | 3.8 |
| 4 | 5.0 | 3.9 |
| 5 | 5.1 | 4.0 |

EXAMPLE 2

The process of Example 1 was repeated except the alumina was pre-dried to a moisture content of 2.5% wt. The water content of the first alcoholic solution was 1.8% wt (1.4% by volume). The water content of the dried product was again 1% by weight. The effect of the recycle of the first alcoholic solution recovered from the condenser and the gamma alumina containing 2.5% wt water was to increase the water content of the first alcoholic solution over the subsequent batches towards a steady state of 2.7% wt (2.1% by volume) as follows;

| Batch No. | Water in first alcoholic solution (% wt) | Water in first alcoholic solution (% vol) |
|---|---|---|
| 1 | 1.8 | 1.4 |
| 2 | 2.3 | 1.8 |
| 3 | 2.5 | 2.0 |
| 4 | 2.6 | 2.0 |
| 5 | 2.7 | 2.1 |

EXAMPLE 3

The process of Example 1 was repeated except the alumina was pre-dried to a moisture content of 1.5% wt and the product was dried instead to 0.5% by weight water. Whereas the water content from the feed alumina was reduced, drying to a lower water content in the product resulted in a first alcoholic solution with an increased water content. The water content of the first alcoholic solution was 1.9% wt (1.5% by volume). The effect of the recycle of the first alcoholic solution recovered from the condenser was to increase the water content of the first alcoholic solution over the subsequent batches towards a steady state of 3.0% wt (2.3% by volume) as follows;

| Batch No. | Water in first alcoholic solution (% wt) | Water in first alcoholic solution (% vol) |
|---|---|---|
| 1 | 1.9 | 1.5 |
| 2 | 2.5 | 2.0 |
| 3 | 2.8 | 2.2 |
| 4 | 2.9 | 2.3 |
| 5 | 3.0 | 2.3 |

EXAMPLE 4

The process of Example 1 was re-modelled to establish the amount of water to be removed from the ethanol-water first alcoholic solution to reduce its water content to 3.0% by weight (2.3% by volume) as an alternative to pre-drying the alumina. Alumina with water contents in the range 3-6% by weight were considered and the silicate-modified products were dried to water levels of 0.5% or 1% by weight. The results were as follows;

| Alumina water content (% weight) | Residual water in dried silicate-modified alumina (% weight) | Water concentration in first alcoholic solution (% weight) | Water concentration in first alcoholic solution (% volume) | Water to be removed from first alcoholic solution (kg per batch). |
|---|---|---|---|---|
| 6.0 | 0.5 | 12.5 | 9.7 | 13.7 |
| 4.0 | 0.5 | 8.9 | 7.0 | 8.3 |
| 4.0 | 1.0 | 6.6 | 5.1 | 4.9 |
| 3.0 | 0.5 | 6.8 | 5.3 | 5.2 |
| 3.0 | 1.0 | 4.2 | 3.3 | 1.6 |

The water in the first alcoholic solution may be removed by one or more steps of distillation, adsorption, and membrane separation.

The invention claimed is:
1. A method for preparing a silica-modified catalyst support, the method comprising:
(i) applying an alkyl silicate solution to a porous support material in an amount to produce a silicate-modified catalyst support having a silica content, expressed as Si, in the range of 0.25 to 15% by weight, the alkyl silicate solution comprising an alkyl silicate admixed in an alcoholic solution containing water in a range of from 0.05 vol % to 10 vol %,
(ii) drying the silicate-modified support and recovering a first recovered alcoholic solution, and
(iii) calcining the dried silicate-modified support to form the silica-modified catalyst support, wherein the first recovered alcoholic solution contains water in a range of from 0.05 vol % to 10 vol % and the alkyl silicate solution contains at least a portion of the first recovered alcoholic solution recycled from the drying of the silicate-modified support.

2. The method according to claim 1, wherein the alkyl silicate concentration in the alkyl silicate solution is in the range of 50-75% by weight.
3. The method according to claim 1, wherein the first recovered alcoholic solution contains less than 5% water by volume.
4. The method according to claim 1, wherein the porous support material has a moisture content of 6.0 wt % or less.
5. The method according to claim 4, further comprising pre-drying the porous support material.
6. The method according to claim 1, further comprising dehydrating the first recovered alcoholic solution before mixing it with the alkyl silicate.
7. The method according to claim 6, wherein the first recovered alcoholic solution is dehydrated by distillation, adsorption, or membrane separation.
8. The method according to claim 1, wherein the porous support material comprises alumina, titania, or zirconia.
9. The method according to claim 1, wherein the porous support material comprises a transition alumina or hydrated alumina.
10. The method according to claim 1, wherein the porous support material is a spray-dried powder with an average particle size in the range of 1 to 200 micrometres.
11. The method according to claim 1, wherein the porous support material is a shaped unit with a particle size in the range of 1 to 50 mm.
12. The method according to claim 1, wherein the alkyl silicate is a tetraalkyl silicate of the formula $Si(OR)_4$, where R is a C1-C4 alkyl group.
13. The method according to claim 1, wherein the alkyl silicate comprises tetraethyl-orthosilicate and the alcohol in the first recovered alcoholic solution comprises ethanol.
14. The method according to claim 1, wherein the silica content of the silica-modified catalyst support, expressed as Si, is in the range of 1 to 10% by weight.
15. The method according to claim 1, wherein the volume of the alkyl silicate solution is less than or equal to the pore volume of the porous support material.
16. The method according to claim 1, wherein the silicate-modified support is dried at a temperature in the range of from 30° C. to 150° C.
17. The method according to claim 1, wherein the moisture content of the dried silicate-modified support is 5% or less by weight.
18. The method according to claim 1, wherein the calcination step is performed by heating the dried support to a temperature in the range of from 500° C. to 1100° C.
19. The method of preparing a catalyst comprising applying a catalytically active material to a silica-modified catalyst support prepared according to the method of claim 1.
20. The method according to claim 19 wherein the catalytically active material comprises cobalt.
21. The method according to claim 1, further comprising treating the dried silicate-modified support with water, drying the resulting water-treated support and recovering a second recovered alcoholic solution.
22. The method according to claim 21, wherein the water treating comprises applying water or water containing an alcohol to the dried silicate-modified support.
23. The method according to claim 22, wherein the water is mains water, distilled water, or purified water.
24. The method according to claim 22, wherein the water containing alcohol comprises at least part of the first recovered alcoholic solution or second alcoholic solution.

25. The method according to claim 22, wherein the water treated support is dried at a temperature in the range of 30-150° C.

26. The method according to claim 1, wherein the first recovered alcoholic solution contains less than 2.45% water by volume.

* * * * *